(12) United States Patent
Jiang et al.

(10) Patent No.: US 11,474,779 B2
(45) Date of Patent: Oct. 18, 2022

(54) METHOD AND APPARATUS FOR PROCESSING INFORMATION

(71) Applicant: Baidu Online Network Technology (Beijing) Co., Ltd., Beijing (CN)

(72) Inventors: Xiangtao Jiang, Beijing (CN); Lijiao Liu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 322 days.

(21) Appl. No.: 16/508,960

(22) Filed: Jul. 11, 2019

(65) Prior Publication Data
US 2020/0065061 A1 Feb. 27, 2020

(30) Foreign Application Priority Data

Aug. 22, 2018 (CN) .......................... 201810961533.4

(51) Int. Cl.
*G06F 3/16* (2006.01)
*G06F 9/451* (2018.01)
*G06F 3/0482* (2013.01)
*G10L 15/22* (2006.01)

(52) U.S. Cl.
CPC ............ *G06F 3/167* (2013.01); *G06F 3/0482* (2013.01); *G06F 9/451* (2018.02); *G10L 15/22* (2013.01); *G06F 2203/04803* (2013.01); *G10L 2015/223* (2013.01)

(58) Field of Classification Search
CPC ........ G06F 3/167; G06F 9/451; G06F 3/0482; G06F 2203/04803; G10L 15/22; G10L 2015/223; G10L 2015/228
See application file for complete search history.

(56) References Cited

U.S. PATENT DOCUMENTS

| | | | |
|---|---|---|---|
| 9,189,197 B1 * | 11/2015 | Lagassey | G06F 9/451 |
| 9,443,527 B1 * | 9/2016 | Watanabe | G10L 15/26 |
| 9,697,822 B1 * | 7/2017 | Naik | G10L 15/22 |
| 9,922,642 B2 * | 3/2018 | Pitschel | G10L 15/063 |
| 10,074,360 B2 * | 9/2018 | Kim | G10L 25/60 |
| 10,446,141 B2 * | 10/2019 | Krishnamoorthy | G10L 15/02 |

(Continued)

FOREIGN PATENT DOCUMENTS

| | | |
|---|---|---|
| CN | 103456298 A | 12/2013 |
| CN | 106601242 A | 4/2017 |

(Continued)

*Primary Examiner* — Ryan Barrett
(74) *Attorney, Agent, or Firm* — Knobbe Martens Olson & Bear LLP

(57) ABSTRACT

Embodiments of the present disclosure disclose a method and apparatus for processing information. A specific embodiment of the method comprises: determining whether to enable a scenario mode based on received voice information; in response to determining to enable the scenario mode, determining a target scenario according to an analysis result of the voice information; acquiring resource information related to the target scenario; and feeding back the acquired resource information to a user. In the scenario mode, the embodiment may s provide many kinds of information resources at the same time for the user to select. This helps to improve the efficiency of the user in acquiring the information and may improve the efficiency of the human-machine interaction.

20 Claims, 6 Drawing Sheets

(56) References Cited

U.S. PATENT DOCUMENTS

| | | | | |
|---|---|---|---|---|
| 10,811,010 B2 * | 10/2020 | Zhang | ................... | G06F 3/167 |
| 2004/0054539 A1 * | 3/2004 | Simpson | ................ | G10L 15/30 |
| | | | | 704/270.1 |
| 2011/0087739 A1 * | 4/2011 | Lin | ...................... | G06F 9/451 |
| | | | | 709/206 |
| 2013/0110515 A1 * | 5/2013 | Guzzoni | ............... | G06N 3/006 |
| | | | | 704/270.1 |
| 2013/0325460 A1 | 12/2013 | Kim et al. | | |
| 2014/0040748 A1 * | 2/2014 | Lemay | ............... | G10L 15/1822 |
| | | | | 715/728 |
| 2017/0047063 A1 * | 2/2017 | Ohmura | ............. | G06F 3/04817 |
| 2019/0066682 A1 * | 2/2019 | Cheng | ................... | G10L 15/26 |
| 2019/0147859 A1 * | 5/2019 | Zu | ........................ | G10L 15/22 |
| | | | | 715/203 |
| 2019/0287528 A1 * | 9/2019 | Hughes | ................. | G10L 15/22 |

FOREIGN PATENT DOCUMENTS

| | | | |
|---|---|---|---|
| JP | 2013141177 A | | 7/2013 |
| JP | 2015041271 A | | 3/2015 |
| JP | 216071248 A | | 5/2016 |
| WO | WO2004027527 A | | 1/2004 |
| WO | WO2016136062 | | 1/2016 |
| WO | WO2017057010 A1 | | 4/2017 |

* cited by examiner

METHOD AND APPARATUS FOR PROCESSING INFORMATION

CROSS-REFERENCE TO RELATED APPLICATIONS

This application claims priority to Chinese Patent Application No. 201810961533.4, filed with the China National Intellectual Property Administration (CNIPA) on Aug. 22, 2018, the content of which is incorporated herein by reference in its entirety.

TECHNICAL FIELD

Embodiments of the present disclosure relate to the field of artificial intelligence technology, and specifically to a method and apparatus for processing information.

BACKGROUND

With the continuous development of artificial intelligence technology, products applying the artificial intelligence technology emerge one after another, which brings convenience to user's daily lives. For example, the users may acquire desired information and services conveniently through voice interactions with smart products. For a current smart product, in the process of interaction, the smart product usually returns only one kind of information or service at a time. If the users want to acquire more information and services, a plurality of interactions generally need to be performed.

SUMMARY

Embodiments of the present disclosure propose a method and apparatus for processing information.

In a first aspect, the embodiments of the present disclosure provide a method for processing information. The method includes: determining whether to enable a scenario mode based on received voice information; in response to determining to enable the scenario mode, determining a target scenario according to an analysis result of the voice information; acquiring resource information related to the target scenario; and feeding back the acquired resource information to a user.

In some embodiments, the target scenario is used to represent a current scenario of the user, and the target scenario includes at least one of: a time scenario, a location scenario or a weather scenario.

In some embodiments, the feeding back the acquired resource information to a user includes: generating voice feedback information based on the acquired resource information, and broadcasting the voice feedback information.

In some embodiments, the feeding back the acquired resource information to a user includes: generating a page image based on the acquired resource information, and presenting the page image. The page image includes a first display region, and at least two display boxes for displaying information are formed in the first display region.

In some embodiments, the generating a page image according to the acquired resource information includes: extracting key information based on the acquired resource information, and acquiring a background image; and using the key information of the resource information and the background image as display information of the resource information, and displaying respectively display information of different resource information in the at least two display boxes.

In some embodiments, the method further includes: presenting in full-screen, in response to detecting a selection operation on the at least two display boxes by the user, detailed content of resource information corresponding to a display box selected by the user. An approach of the selection operation includes at least one of: a voice operation, a touch operation or a key-pressing operation.

In some embodiments, the page image further includes a second display region. The method further includes: enlarging and displaying, in response to detecting the selection operation on the at least two display boxes by the user, display information in the display box selected by the user in the second display region, or enlarging and displaying detailed content of resource information corresponding to a display box selected by the user in the second display region; and displaying, in response to detecting the selection operation on the selected display box by the user again or detecting a holding time length of the current selection operation reaching a preset time length, displaying in full-screen the detailed content of the resource information corresponding to the selected display box.

In some embodiments, the determining whether to enable a scenario mode based on received voice information includes: determining whether the voice information includes preset information in a preset data set; and determining to enable the scenario mode in response to determining that the voice information includes the preset information in the preset data set. Preset data in the preset data set includes the preset information and a preset scenario corresponding to the preset information. The determining a target scenario based on an analysis result of the voice information includes: finding, in the preset data set, a preset scenario corresponding to preset information included in the voice information, to be used as the target scenario.

In some embodiments, the preset data in the preset data set further includes an application identifier corresponding to the preset scenario. The acquiring resource information related to the target scenario includes: finding, in the preset data set, an application identifier corresponding to the target scenario, to be used as a target application identifier; and acquiring resource information of an application indicated by the target application identifier.

In some embodiments, the feeding back the acquired resource information to a user includes: sorting the acquired resource information, and feeding back the sorted resource information to the user.

In some embodiments, the method further includes: performing a statistical analysis on interaction behaviors of the user, adjusting the resource information related to the target scenario and/or adjusting the sorting of the resource information based on the statistical analysis result.

In a second aspect, the embodiments of the present disclosure provide an apparatus for processing information. The apparatus includes: an analyzing unit, configured to determine whether to enable a scenario mode based on received voice information; a determining unit, configured to determine, in response to determining to enable the scenario mode, a target scenario according to an analysis result of the voice information; an acquiring unit, configured to acquire resource information related to the target scenario; and a feeding-back unit, configured to feedback the acquired resource information to a user.

In some embodiments, the target scenario is used to represent a scenario where the user is currently located, and the target scenario includes at least one of: a time scenario, a location scenario or a weather scenario.

In some embodiments, the feeding-back unit includes: a broadcasting subunit, configured to generate voice feedback information based on the acquired resource information, and broadcast the voice feedback information.

In some embodiments, the feeding-back unit includes: a presenting subunit, configured to generate a page image based on the acquired resource information, and present the page image. The page image includes a first display region, and at least two display boxes for displaying information are formed in the first display region.

In some embodiments, the presenting subunit is further configured to extract key information based on the acquired resource information, and acquire a background image; and use the key information of the resource information and the background image as display information of the resource information, and display respectively display information of different resource information in the at least two display boxes.

In some embodiments, the apparatus further includes: a first detecting unit, configured to present in full-screen, in response to detecting a selection operation on the at least two display boxes by the user, detailed content of resource information corresponding to a display box selected by the user. An approach of the selection operation includes at least one of: a voice operation, a touch operation or a key-pressing operation.

In some embodiments, the page image further includes a second display region. The apparatus further includes: a second detecting unit, configured to enlarge and display, in response to detecting the selection operation on the at least two display boxes by the user, display information in the display box selected by the user in the second display region, or enlarge and display the detailed content of the resource information corresponding to the display box selected by the user in the second display region; and a third detecting unit, configured to display, in response to detecting the selection operation on the selected display box by the user again or detecting a holding time length of the current selection operation reaching a preset time length, displaying in full-screen the detailed content of the resource information corresponding to the selected display box.

In some embodiments, the analyzing unit is further configured to: determine whether the voice information includes preset information in a preset data set; and determine to enable the scenario mode in response to determining that the voice information includes the preset information in the preset data set. Preset data in the preset data set includes the preset information and a preset scenario based on the preset information. The determining unit is further configured to: find, in the preset data set, the preset scenario corresponding to the preset information included in the voice information, to be used as the target scenario.

In some embodiments, the preset data in the preset data set further includes an application identifier corresponding to the preset scenario. The acquiring unit is further configured to: find, in the preset data set, the application identifier corresponding to the target scenario, to be used as a target application identifier; and acquire resource information of an application indicated by the target application identifier.

In some embodiments, the feeding-back unit is further configured to: sort the acquired resource information, and feed back the sorted resource information to the user.

In some embodiments, the apparatus further includes: an adjusting unit, configured to perform a statistical analysis on interaction behaviors of the user, adjust the resource information related to the target scenario and/or adjust the sorting of the resource information based on the statistical analysis result.

In a third aspect, the embodiments of the present disclosure provide an electronic device. The electronic device includes: one or more processors; a receiving device, configured to receive voice information; a playing device, configured to play audio information; a display screen, configured to present image information; and a storage device, configured to store one or more programs. The one or more programs, when executed by the one or more processors, cause the one or more processors to implement the method described in any embodiment in the first aspect.

In a fourth aspect, the embodiments of the present disclosure provide a computer readable medium storing a computer program. The computer program, when executed by a processor, implements the method described in any embodiment in the first aspect.

According to the method and apparatus for processing information provided by the embodiments of the present disclosure, whether to enable the scenario mode may be determined based on the received voice information. In the situation of determining to enable the scenario mode, the target scenario may be determined based on the analysis result of the voice information. Therefore, the resource information related to the target scenario may be acquired, and the acquired resource information may be fed back to the user. That is, when the scenario mode is enabled, the method may provide the user with many kinds of information resources at the same time, for the user to select. This helps to improve the efficiency of the user in acquiring the information and may further improve the efficiency of the human-machine interaction.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure will be described below in detail with reference to the accompanying drawings and in combination with the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
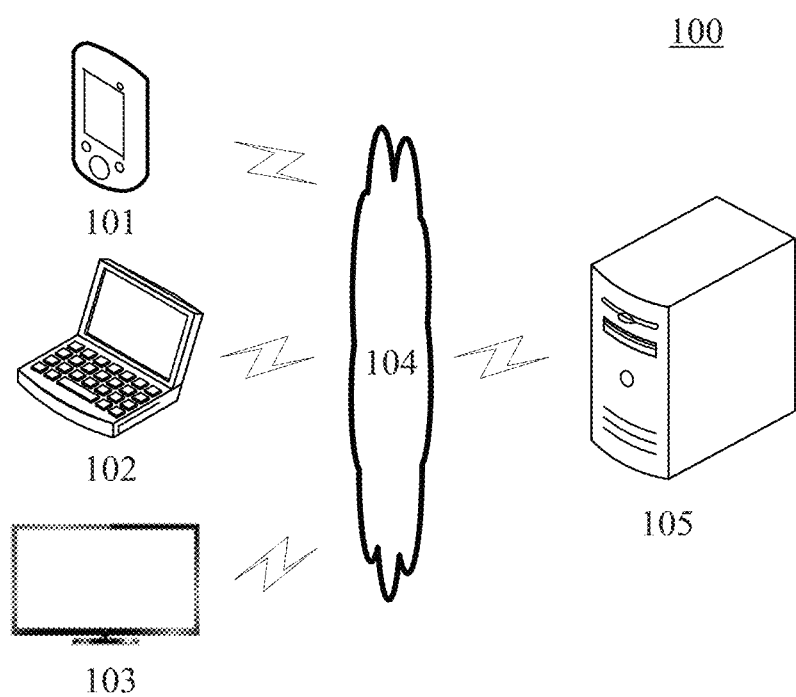
FIG. 1 is a diagram of an exemplary system architecture in which an embodiment of the present disclosure may be applied.

FIG. 1 shows an exemplary system architecture 100 in which a method for processing information or an apparatus for processing information according to the embodiments of the present disclosure may be applied.

As shown in FIG. 1, the system architecture 100 may include terminals 101, 102 and 103, a network 104 and a server 105. The network 104 may serve as a medium providing a communication link between the terminals 101, 102 and 103 and the server 105. The network 104 may include various types of connections, for example, wired or wireless communication links, or optical fiber cables.

A user may interact with the server 105 via the network 104 using the terminals 101, 102 and 103 to receive or send messages. Various client applications (e.g., web browsers, search applications, video applications, weather applications, calendar applications and instant communication tools) may be installed on the terminals 101, 102 and 103.

The user may perform a voice interaction with the terminals 101, 102 and 103 to acquire required resource information. When detecting the input of voice information, the terminals 101, 102 and 103 may recognize and analyze the received voice information of the user, and may feed the recognition result and the analysis result (e.g., the resource information related to a target scenario) back to the user.

Here, the terminals 101, 102 and 103 may be hardware or software. When being the hardware, the terminals 101, 102 and 103 may be various electronic devices having a display screen, which include, but not limited to, a smart phone, a tablet computer, a smart television, an e-book reader, a MP3 (moving picture experts group audio layer III) player, a laptop portable computer and a desktop computer. When being the software, the terminals 101, 102 and 103 may be installed in the above listed electronic devices. The terminals may be implemented as a plurality of pieces of software or a plurality of software modules (e.g., software or software modules for providing a distributed service), or as a single piece of software or a single software module, which will not be specifically defined here.

The server 105 may be a server providing various services, for example, a backend server providing a support for the applications installed on the terminals 101, 102 and 103. The backend server may perform an analysis on an operation in the applications on the terminals 101, 102 and 103, and may return the processing result (the response information corresponding to the operation) to the terminals 101, 102 and 103.

Here, the server 105 may also be hardware or software. When being the hardware, the server 105 may be implemented as a distributed server cluster composed of a plurality of servers, or as a single server. When being the software, the server 105 may be implemented as a plurality of pieces of software or a plurality of software modules (e.g., software or software modules for providing a distributed service), or as a single piece of software or a single software module, which will not be specifically defined here.

It should be noted that the method for processing information provided by the embodiments of the present disclosure is generally performed by the terminals 101, 102 and 103. Correspondingly, the apparatus for processing information is generally provided in the terminals 101, 102 and 103.

It should be appreciated that the numbers of the terminals, the networks, and the servers in FIG. 1 are merely illustrative. Any number of terminals, networks, and servers may be provided based on actual requirements.

Figure 2:
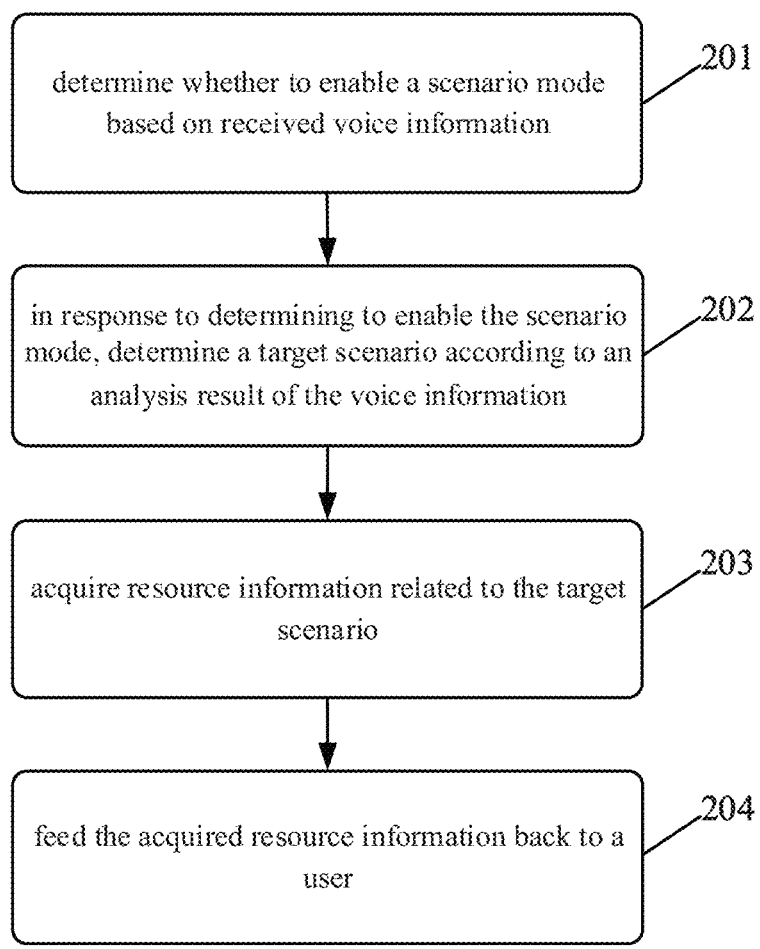
FIG. 2 is a flowchart of an embodiment of a method for processing information according to the present disclosure.

Further referring to FIG. 2, a flow 200 of an embodiment of a method for processing information according to the present disclosure is illustrated. The method for processing information may include the following steps.

Step 201, determining whether to enable a scenario mode based on received voice information.

In this embodiment, an executor (e.g., the terminals 101, 102 and 103 shown in FIG. 1) of the method for processing information may receive the voice information of a user through a receiving device communicatively connected to the executor. The receiving device here may be various devices having a voice receiving function, for example, a microphone. The receiving device may be installed on the executor, or set independently. Here, the voice information may include at least one character such as a text, a number or a letter.

In this embodiment, the executor may recognize and analyze the received voice information, to determine whether to enable the scenario mode. Here, in the scenario mode, the executor may acquire many kinds of resource information during the interaction with the user, and may provide the user with the resource information at the same time for the user to select. However, in a non-scenario mode, the executor often interacts with the user in a way of one answer to one question. That is, for the voice command sent by the user every time, only the corresponding resource information of a single category is returned.

For example, the voice command refers to "what is the weather like today in XX city?" In the scenario mode, the executor may provide the user with the weather information, the traffic information and the vehicle restriction information of XX city. In the non-scenario mode, the executor only provides the user with the weather information of XX city. That is, the interactive way in the non-scenario mode is the same as the existing interactive way. The user generally needs multiple interactions to acquire more resource information.

In some alternative implementations of this embodiment, the executor may determine whether to enable the scenario mode based on the current time and/or the current location when the voice information is received. For example, the executor may use big data to perform a statistical analysis on historical interaction behaviors of different users. The interaction behaviors here may include interaction time (and/or interaction locations) as well as interactive content. Thus, the demand information of most users at different time periods (and/or different locations) may be determined. As another example, the executor may perform a statistical analysis on the historical interaction behaviors of a user using the executor, to determine the behavior habit of the user. In this way, the analysis result may be more in line with the demand of the user, thereby improving the accuracy of the analysis result.

As an example, in the morning (e.g., 6:00-8:00), the user often acquires various kinds of information such as weather, traffics and news. Therefore, if the executor determines that the current time when the voice information is received is a morning time period, the executor may determine to enable the scenario mode. As another example, for a user whose interaction location is in a residential area, which means that the user may be at home, the user often acquires information such as road traffic, and weather. For a user whose interaction location is in an office building, which means that the user may be at the office, the user generally acquires information such as work schedules and news. At this time, if the executor determines that the current location when the voice information is received is in the residential area or in the office building, the executor may determine to enable the scenario mode. As another example, in general, the information acquired in different time periods by users at different geographic locations may be different. Therefore, in order to improve the accuracy of the analysis result, according to the current time and the current location when the voice information is received, the executor may determine whether to enable the scenario mode.

Alternatively, the executor may further determine whether the received voice information includes preset information in a preset data set. If the executor determines that the voice information includes the preset information, the executor may determine to enable the scenario mode. Here, the preset data in the preset data set may include the preset information and the preset scenario corresponding to the preset information. The preset information herein may be information including at least one character such as a text, a number or a letter, for example, may be a keyword or a sentence. The preset scenario may be user-defined, or selected from intrinsic scenarios by the user. It should be noted that the preset information and the corresponding relationship between the preset information and the preset scenario may be adjusted according to actual demands of the user. In addition, the storage location of the preset data set is not limited in the present disclosure. For example, the preset data set may be stored locally in the executor, or stored on other electronic devices (e.g., the server 105 shown in FIG. 1).

It may be understood that the executor needs to enable a voice interaction function before receiving the voice information of the user. For example, when the executor detects that the user sends a specified voice command, that the voice input button (physical button or virtual button) is triggered, or that the current time reaches a preset time (e.g., 7:00 every day), the executor may enable the voice interaction function.

Step 202, determining, in response to determining to enable the scenario mode, a target scenario according to an analysis result of the voice information.

In this embodiment, when the executor determines to enable the scenario mode, the executor may determine the target scenario based on the analysis result of the analysis on the voice information. Here, the analysis result of the voice information may include (but not limited to) the current time and the current location at the time of receiving the voice information, and the content of the voice information. The target scenario may be a scenario related to the analysis result of the voice information.

In some alternative implementations of this embodiment, the executor may determine the target scenario according to the current time at the time of receiving the voice information. For example, if the current time is the morning time period, the target scenario may be a morning scenario; if the current time is a noon time period (e.g., 11:30-13:30), the target scenario may be a noon scenario; If the current time is a night time period (e.g., 18:00-21:00), the target scenario may be a night scenario. That is, the target scenario may be a time scenario.

Alternatively, the executor may also determine the target scenario according to the current location at the time receiving the voice information. For example, if the current location is in the residential area, the target scenario may be a home scenario; if the current location is in the office building, the target scenario may be an office scenario. That is, the target scenario may also be a location scenario. Alternatively, the executor may also determine the target scenario according to the current time and the current location when the voice information is received. For example, if the current time is the morning time period and the current location is in the residential area, the target scenario may be the morning home scenario.

Further, if the voice information includes the preset information in the preset data set, the executor may find, in the preset data set, a preset scenario corresponding to the preset information included in the voice information. Then, the found preset scenario may be used as the target scenario. For example, the voice information includes the preset information "weather," the executor may use the preset scenario "weather scenario" corresponding to "weather" as the target scenario.

In some embodiments, the executor may also perform voiceprint recognition on the voice information, and then, matching may be performed in stored voiceprint data. If at least two types of voiceprints are recognized, and the stored voiceprint data only stores the voiceprint data matching a part of the recognized at least two types of voiceprints. That is, in the recognized at least two types of voiceprints, some of the voiceprints may be found in the voiceprint data, and the other voiceprints are not found in the voiceprint data. It indicates that there may be other unfamiliar users and the user who uses the executor in the current environment. At this time, the executor may determine that the target scenario is a reception scenario or a conference scenario. That is, the target scenario may be used to represent the scenario (time, location, scenario, etc.) in which the user is currently located.

It should be noted that the voiceprint data may be preset and inputted by the user, or may be obtained through the statistical analysis performed by the executor based on historical interaction information. For example, the executor may store the voiceprint that often appears in the historical interactions (e.g., the ratio of appearance is up to 70%), or may store the voiceprint that often appears in recent interactions (e.g., interactions within a month).

Step 203, acquiring resource information related to the target scenario.

In this embodiment, the executor may acquire the resource information related to the target scenario when determining the target scenario. The resource information herein may generally refer to a plurality of (at least two) kinds of information related to the target scenario. It may be understood that the resource information may be information in various applications (e.g., a weather application, a map application, a calendar application, a video software application and a chat software application) installed on the executor, or may be various functions (e.g., a photographing function, a flashlight function, a reminder function and a setting function) that can be implemented by the executor.

As an example, the executor may select at least two kinds of resource information according to the result of the statistical analysis on the historical interaction behaviors of the different users or on the historical interaction behaviors of the user using the executor. Therefore, the selected at least two kinds of resource information may be used as the resource information related to the target scenario. Here, the selection approach is not limited in the present disclosure. For example, the at least two kinds of resource information may be randomly selected. Alternatively, according to a descending order of the numbers of acquisitions, the at least two kinds of resource information may be selected or extracted sequentially from the end at which the numbers are larger.

Alternatively, the preset data in the preset data set may further include an application identifier corresponding to the preset scenario. The application identifier may be used to uniquely indicate the application. The application identifier may include at least one of the characters such as a text, a number, a letter or a symbol. For example, the application identifier may be the name or the serial number of the application. At this time, the executor may find, in the preset data set, the application identifier corresponding to the target scenario. Therefore, the found application identifier may be used as the target application identifier. Further, the executor may acquire the resource information of the application indicated by the target application identifier. For example, the resource information related to the morning scenario may include: weather, a schedule reminder, traffic information, news and the like. As another example, the resource information related to the noon scenario may include: a popular short video, music, a television drama and the like. As another example, the resource information related to the night scenario may include: a game, a movie, a television drama, news, daily jokes and the like.

Step 204, feeding back the acquired resource information to a user.

In this embodiment, the executor may feed the resource information acquired in step 203 back to the user. The feedback approach herein is not limited in the present disclosure, for example, may include, but not limited to, a voice feedback and/or image feedback.

In some alternative implementations of this embodiment, the executor may generate voice feedback information based on the acquired resource information, and may broadcast the voice feedback information. For example, the executor may use the names of the acquired various kinds of resource information as the content of the voice feedback information. Therefore, the names of the various kinds of resource information may be broadcasted one by one. Alternatively, when generating the voice feedback information, corresponding serial numbers may be set for the names of the acquired various kinds of resource information. Then, the serial numbers and the corresponding names may be broadcasted, for example, "1. weather, 2. news, 3. anniversary reminder . . . ."

At this time, when the voice selection command of the user is detected, the executor may broadcast the detailed content of the resource information indicated by the voice selection command. The voice selection command may be used to represent the selection for the resource information in the voice feedback information. For example, the voice selection command may include the serial number and/or the name of the resource information.

Figure 3A:
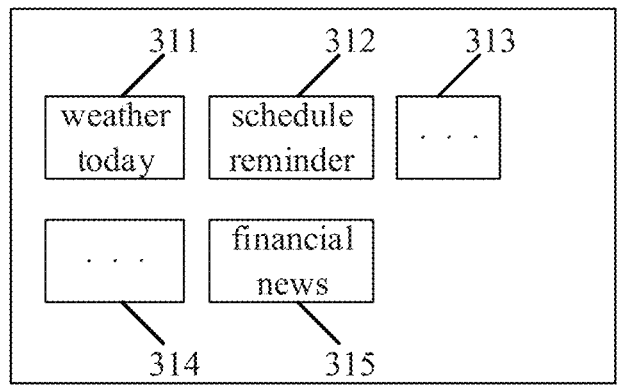
FIGS. 3A and 3B are respectively schematic diagrams of two embodiments of a page image in the present disclosure.

Alternatively, the executor may generate a page image based on the acquired resource information, and may present the generated page image. Here, the page image may include a first display region. At least two display boxes for displaying information may be formed in the first display region. For example, the executor may use the name of the application (e.g., weather) as the display information of the resource information, or may extract, from the resource information, key information (e.g., a current temperature, a temperature range and meteorological phenomena) as the display information. At the same time, display boxes may be assigned to different resource information. Generally, one kind of resource information corresponds to one display box. Then, the display information of the corresponding resource information may be displayed in the respective display boxes. As shown in FIG. 3A, the respective display boxes 311, 312 . . . 315 of the page image may respectively display "Today's weather, schedule reminder . . . financial news."

Further, in order to enrich the content of the page image and improve the display effect, the executor may also extract the key information based on the acquired resource information, and acquire a background image. Thus, the key information and the background image may be used as the display information of the resource information. Then, the display information of different resource information may be displayed in at least two display boxes. The background image here may be pre-stored and set, or may be obtained by intercepting detailed pictures (e.g., news pictures and traffic maps) in the resource information.

It should be noted that the number of the display boxes and the sizes of the display boxes in the first display region may be fixed, or may be adjusted according to the number of to-be-displayed resource information. For example, the number of the display boxes may be determined according to the number of the resource information. As another example, the sizes and the number of the display boxes may be determined according to the size of the first display region and the number of resource information. Thus, it may be ensured that all of the resource information are displayed in the first display region, which is convenient for users to consult and operate.

At this time, when the executor detects a selection operation on the at least two display boxes by the user, the executor may present the detailed content of the resource information corresponding to the display box selected by the user in full-screen. The approach of the selection operation is not limited in the present disclosure, for example, may include at least one of: a voice operation, a touch operation or a key-pressing operation. The presenting approach may include displaying and/or TTS (Text To Speech) broadcasting the detailed content.

As an example, if the user performs the selection by voice or through a click touch, the executor may directly present the detailed content of the resource information indicated by the selection in full-screen. If the user performs the selection by pressing a key, the executor may present the detailed content of the resource information indicated by the selection in full-screen, when a specified key (e.g., a determination key) is triggered or the holding time length of the selection reaches a preset time length (e.g., 3 seconds). This facilitates the user to switch between key selections, and also helps to reduce the operation processes of the user. Here, the holding time length may be a time length in which the state of the selection does not change, for example, the time length the selection identifier stays in a certain display box. The representing approach of the selection identifier is not limited in the present disclosure, for example, may be an arrow or a block, or may be reflected by adjusting the display form of the selected display box, for example, the selected display box is slightly enlarged and/or the display information in the display box is broadcasted.

Figure 3B:
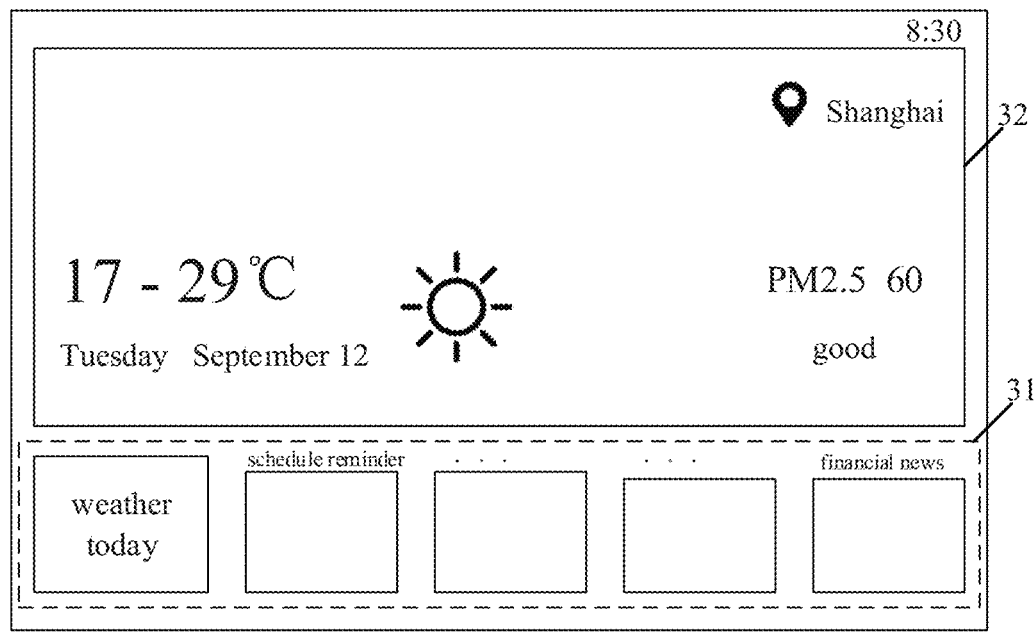

In some application scenarios, the page image may further include a second display region. In this way, when the selection operation on the at least two display boxes by the user is detected by the executor, the display information in the display box selected by the user may be enlarged and displayed in the second display region, or the detailed content of the resource information corresponding to the display box selected by the user may be enlarged and displayed in the second display region. That is, the area of the second display region is generally larger than the area of each display box. As shown in FIG. 3B, if the user selects the first display box (i.e., the resource information of the weather today) in the first display region 31, the background image, the location (e.g., Shanghai), the date (e.g., September 12, Tuesday), the temperature (e.g., 17-29 C.°, sunny) and the air quality (PM2.5: 60, good) may be enlarged and displayed in the second display box 32.

At this time, when the selection operation on the selected display box by the user is detected again (e.g., the determination key is triggered), or detecting that the holding time length of the current selection operation reaches the preset time length is detected, the executor may display the detailed content of the resource information corresponding to the selected display box in full-screen. For example, if the user selects the first display box in FIG. 3B again, the executor may display the detailed information of the weather today (e.g., the current temperature and the temperature change curve) and the weather conditions in recent days (e.g., 5 days).

As may be seen from FIGS. 3A and 3B, the page image as a whole presents the resource information in the form of a card. The respective cards may display different information according to the different resource information. That is, in the scenario mode, the voice interaction process may change from receiving the command passively to thinking actively about the user demands. Therefore, various information resources may be provided for the user to select. Then, the user may further acquire the detailed content of the required information by selecting a card. It helps to improve the efficiency of the user in acquiring the information, and may improve the efficiency of the human-machine interaction.

It should be noted that, before feeding back the resource information to the user, the executor may further process the resource information according to the target scenario, and then may feed the processed resource information back to the user. For example, in the reception scenario, the part of the resource information that contains personal information (e.g., a portrait in a photo album) may be screened to avoid being seen by the guest. This helps to protect the privacy of the user. As another example, in the morning scenario or reception scenario, relaxing and cheerful music may be selected in music resources. In this way, the user demands may be better satisfied, thus improving the user experience.

According to the method for processing information in this embodiment, whether to enable the scenario mode may be determined based on the received voice information. In the situation of determining to enable the scenario mode, the target scenario may be determined based on the analysis result of the voice information. Therefore, the resource information related to the target scenario may be acquired, and the acquired resource information may be fed back to the user. That is, when the scenario mode is enabled, based on the voice information of the user, the method may provide the user with many kinds of information resources at the same time, for the user to select. This helps to improve the efficiency of the user in acquiring the information and may further improve the efficiency of the human-machine interaction.

Figure 4:
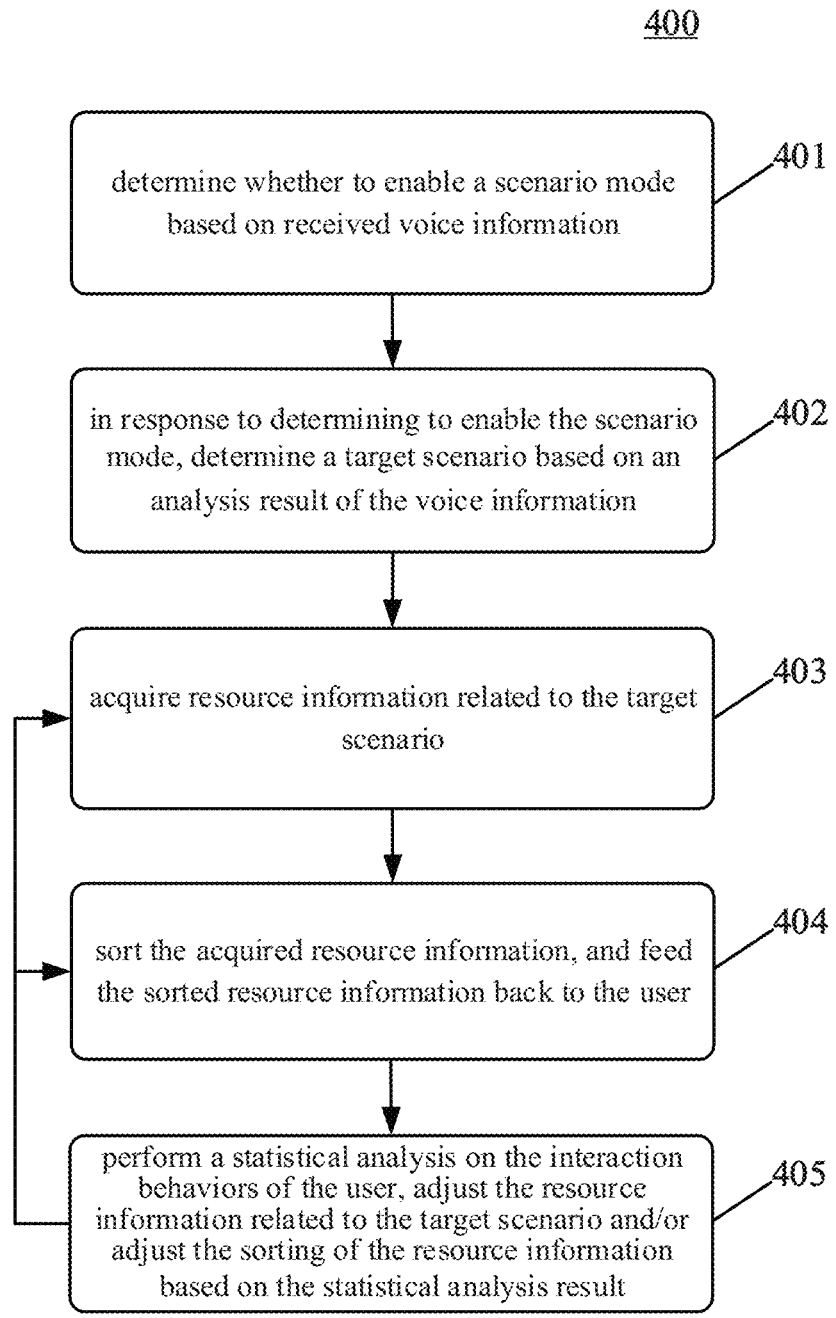
FIG. 4 is a flowchart of another embodiment of the method for processing information according to the present disclosure.

Referring to FIG. 4, FIG. 4 illustrates a flow 400 of another embodiment of the method for processing information according to the present disclosure. The method for processing information may include the following steps:

Step 401, determining whether to enable a scenario mode based on received voice information.

In this embodiment, an executor (e.g., the terminals 101, 102 or 103 shown in FIG. 1) of the method for processing information may recognize and analyze the received voice information, to determine whether to enable the scenario mode. Here, in the scenario mode, the executor may acquire many kinds of resource information during the interaction with the user, and may provide the user with those resource information at the same time for the user to select. In a non-scenario mode, the executor often interacts with the user in a way of one answer to one question, that is, for the voice command sent by the user every time, only the corresponding resource information of a single category is returned. Reference may be made to relative descriptions of step 201 in the embodiment of FIG. 2, which will not be repeatedly described here.

Step 402, in response to determining to enable the scenario mode, determining a target scenario based on an analysis result of the voice information.

In this embodiment, when the executor determines to enable the scenario mode, the executor may determine the target scenario based on the analysis result of the voice information in step 401. Here, the analysis result of the voice information may include (but not limited to) the current time and the current location at the time of receiving the voice information, and the content and the sound of the voice information. The target scenario may be a scenario related to the analysis result of the voice information. Reference may be made to relative descriptions of step 202 in the embodiment of FIG. 2, which will not be repeatedly described here.

Step 403, acquiring resource information related to the target scenario.

In this embodiment, in the situation where the target scenario is determined, the executor may acquire the resource information related to the target scenario. The resource information here may generally refer to many (at least two) kinds of information related to the target scenario. Reference may be made to relative descriptions of step 203 in the embodiment of FIG. 2, which will not be repeatedly described here.

Step 404, sorting the acquired resource information, and feeding back the sorted resource information to the user.

In this embodiment, the executor may adopt various ways to sort the acquired resource information. For example, based on big data or the result of a statistical analysis on the historical interaction behaviors of the user, the executor may sort the acquired resource information in a descending order of the numbers of acquisitions. As another example, according to preset priority levels of respective pieces of information, the executor may sort the acquired resource information according to the descending order of the priority levels. As an example, if today is an anniversary or an important meeting is scheduled, the executor may determine that the priority level of the schedule reminder is higher.

In this embodiment, the executor may feed the sorted resource information back to the user. Reference may be made to relative descriptions of step 204 in the embodiment of FIG. 2, which will not be repeatedly described here.

Step 405, performing a statistical analysis on interaction behaviors of the user, adjusting the resource information related to the target scenario and/or adjusting the sorting of the resource information based on the statistical analysis result.

In this embodiment, the executor may record the interaction behavior data of the user, for example, the selection operation of the user on the resource information fed back, and may perform the statistical analysis on the data. Further, based on the statistical analysis result, the executor may adjust the resource information related to the target scenario, and/or may adjust the sorting result of the resource information.

For example, the executor may delete or replace the resource information not selected by the user, and may update the preset data in the preset data set. As another example, the executor may arrange the resource information which is selected more times in front of the resource information which is selected fewer times or not selected. As another example, the executor may adjust the sorting of the resource information according to the order in which the user selects the resource information.

According to the method for processing information in this embodiment, by feeding the sorted resource information back to the user, the feedback result may be more in line with the demands of the user, which helps to improve the efficiency of the user in acquiring the information. In addition, the step of performing the statistical analysis on the interaction behaviors of the user is added. In this way, the resource information may be adjusted according to the demands of the user in different periods, thereby enriching and perfecting the processing of the method. It helps to improve the accuracy of the processing result, and then may improve the efficiency of the interaction.

Figure 5:
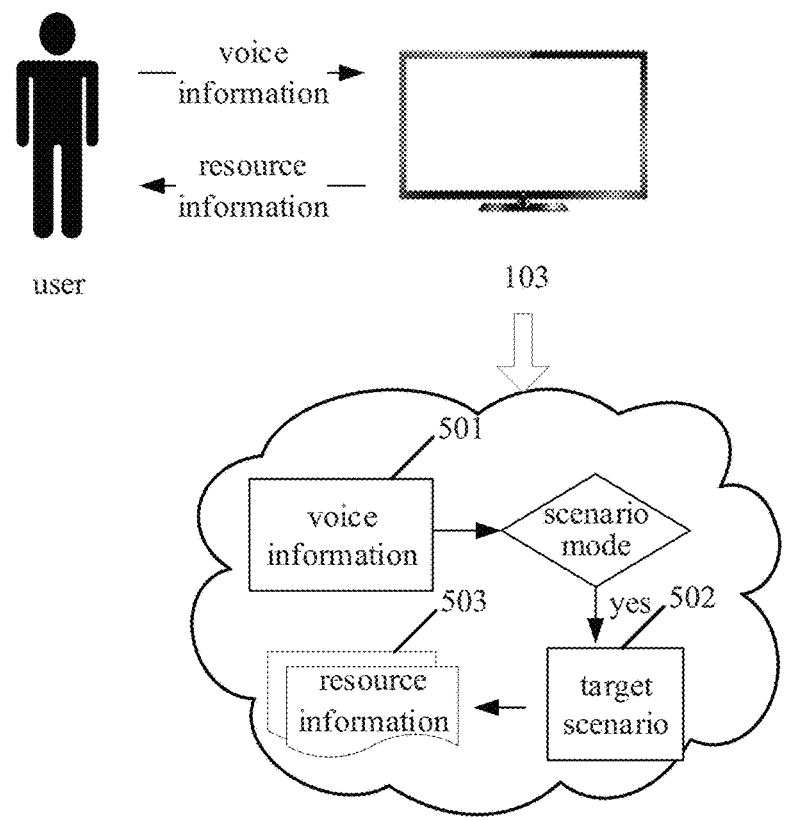
FIG. 5 is a schematic diagram of an application scenario of the method for processing information according to the present disclosure.

Further referring to FIG. 5, FIG. 5 is a schematic diagram of an application scenario of the method for processing information according to the embodiments described above. In the application scenario of FIG. 5, the user may install a smart television 103 having the voice interaction function at home. The smart television 103 may not only have the playing function of a traditional television, but also have various functions and applications of a network television. For example, television programs (e.g., movies, television dramas and variety shows) on demand, and information (e.g., weather) inquiry. In this way, the user may acquire the required information by interacting with the smart television 103. As an example, in the morning, the user may send the voice information "good morning" to the smart television 103. At this time, after receiving the voice information of the user, the smart television 103 may run the method for processing information, including the following steps:

First, whether to enable a scenario mode may be determined based on the received voice information (good morning) 501. Then, if it is determined that the scenario mode is to be enabled, a target scenario (e.g. morning scenario) 502 may be determined based on the analysis result of the voice information. Next, the resource information (e.g., weather, news, a reminder and traffics) 503 related to the target scenario 502 may be acquired, and the acquired resource information 503 may be sorted. Finally, the sorted resource information (e.g., the weather, the reminder, the traffics and the news) 503 may be presented to the user.

Then, the user may select the required resource information therefrom. For example, the required resource information is selected by using a key on the remote control, by sending a voice command to the microphone on the remote control, or by directly sending the voice command to the smart television 103. After the selection operation of the user is detected, the smart television 103 may display the detailed content of the resource information selected by the user, and may perform TTS broadcast.

Figure 6:
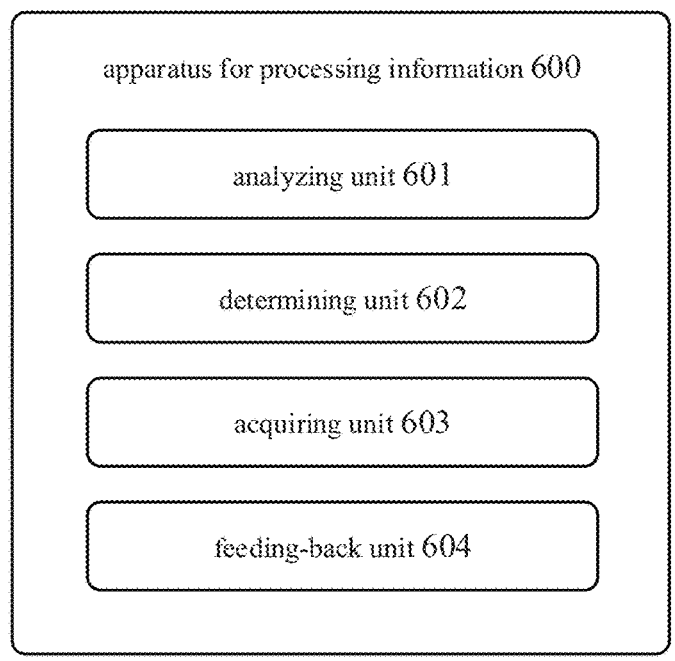
FIG. 6 is a schematic structural diagram of an embodiment of an apparatus for processing information according to the present disclosure.

Further referring to FIG. 6, as an implementation of the method shown in the above drawings, the present disclosure provides an embodiment of an apparatus for processing information. The embodiment of the apparatus corresponds to the embodiments of the method shown in the above embodiments, and the apparatus may be applied in various electronic devices.

As shown in FIG. 6, the apparatus 600 for processing information in this embodiment may include: an analyzing unit 601, configured to determine whether to enable a scenario mode based on received voice information; a determining unit 602, configured to determine, in response to determining to enable the scenario mode, a target scenario according to an analysis result of the voice information; an acquiring unit 603, configured to acquire resource information related to the target scenario; and a feeding-back unit 604, configured to feed back the acquired resource information to a user.

In some alternative implementations of this embodiment, the target scenario may be used to represent a current scenario of the user. Here, the target scenario may include at least one of: a time scenario, a location scenario or a weather scenario.

As an example, the feeding-back unit 604 may include: a broadcasting subunit (not shown in FIG. 6), configured to generate voice feedback information based on the acquired resource information, and broadcast the voice feedback information.

Alternatively, the feeding-back unit 604 may further include: a presenting subunit (not shown in FIG. 6), configured to generate a page image based on the acquired resource information, and present the page image. The page image includes a first display region, and at least two display boxes for displaying information are formed in the first display region.

Further, the presenting subunit may further be configured to extract key information based on the acquired resource information, and acquire a background image; and use the key information of the resource information and the background image as display information of the resource information, and display respectively display information of different resource information in the at least two display boxes.

In some embodiments, the apparatus 600 may further include: a first detecting unit (not shown in FIG. 6), configured to present in full screen, in response to detecting a selection operation on the at least two display boxes by the user, detailed content of resource information corresponding to a display box selected by the user. An approach of the selection operation includes at least one of: a voice operation, a touch operation or a key-pressing operation.

Alternatively, the page image may further include a second display region, and the apparatus 600 may further include: a second detecting unit (not shown in FIG. 6), configured to enlarge and display, in response to detecting the selection operation on the at least two display boxes by the user, display information in the display box selected by the user in the second display region, or enlarge and display detailed content of the resource information corresponding to a display box selected by the user in the second display region; and a third detecting unit (not shown in FIG. 6), configured to display, in response to detecting the selection operation on the selected display box by the user again or detecting a holding time length of the current selection operation reaching a preset time length, displaying in full-screen the detailed content of the resource information corresponding to the selected display box in the full-screen.

In some application scenarios, the analyzing unit 601 may further be configured to: determine whether the voice information includes preset information in a preset data set; and determine to enable the scenario mode in response to determining that the voice information includes the preset information in the preset data set. Preset data in the preset data set includes the preset information and a preset scenario corresponding to the preset information. The determining unit 602 may further be configured to: find, in the preset data set, the preset scenario based on the preset information included in the voice information, to be used as the target scenario.

Further, the preset data in the preset data set may further include an application identifier corresponding to the preset scenario. The acquiring unit 603 may further be configured to: find, in the preset data set, the application identifier corresponding to the target scenario, to be used as a target application identifier; and acquire resource information of an application indicated by the target application identifier.

Alternatively, the feeding-back unit 604 may further be configured to: sort the acquired resource information, and feed the sorted resource information back to the user.

In some embodiments, the apparatus 600 may further include: an adjusting unit (not shown in FIG. 6), configured to perform a statistical analysis on interaction behaviors of the user, adjust the resource information related to the target scenario and/or adjust the sorting of the resource information based on the statistical analysis result.

It may be understood that the units recited in the apparatus 600 correspond to the steps in the method described with reference to FIGS. 2 and 3. Thus, the above operations and the above features described for the method and the generated beneficial effects are also applicable to the apparatus 600 and the units included therein, which will not be repeatedly described here.

Figure 7:
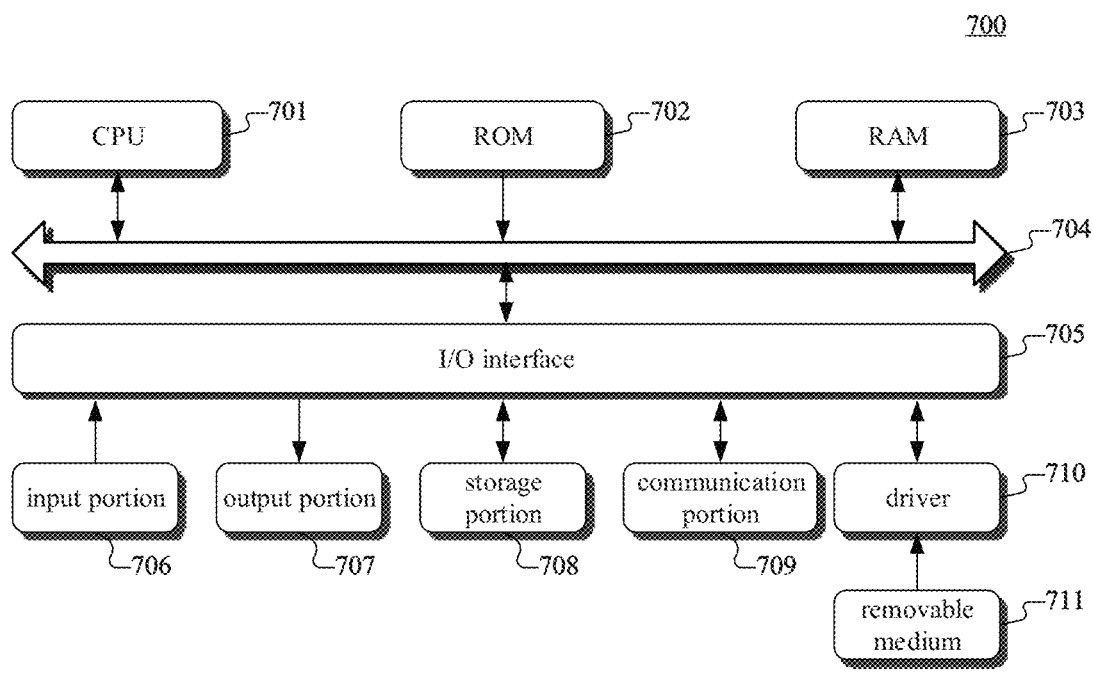
FIG. 7 is a schematic structural diagram of a computer system adapted to implement an electronic device according to the embodiments of the present disclosure.

Referring to FIG. 7, FIG. 7 is a schematic structural diagram of a computer system 700 adapted to implement an electronic device (e.g., the terminals 101, 102 and 103 shown in FIG. 1) of the embodiments of the present disclosure. The electronic device shown in FIG. 7 is merely an example, and should not bring any limitations to the functions and the scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a touch screen, a key, a microphone, a camera and the like; an output portion 707 including a cathode ray tube (CRT), a liquid crystal display device (LCD), a speaker, etc.; a storage portion 708 including a hard disk and the like; and a communication portion 709 including a network interface card such as a LAN card and a modem. The communication portion 709 performs communication processes via a network such as the Internet. A driver 710 is also connected to the I/O interface 705 as required. A removable medium 711 such as a magnetic disk, an optical disk, a magneto-optical disk, and a semiconductor memory may be installed on the driver 710, to facilitate the retrieval of a computer program from the removable medium 711, and the installation thereof on the storage portion 708 as needed.

In particular, according to embodiments of the present disclosure, the process described above with reference to the flowchart may be implemented in a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 709, and/or may be installed from the removable medium 711. The computer program, when executed by the central processing unit (CPU) 701, implements the above mentioned functionalities defined in the method of the present disclosure. It should be noted that the computer readable medium in the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs, which may be used by an instruction execution system, apparatus or element or incorporated thereto. In the present disclosure, the computer readable signal medium may include a data signal that is propagated in a baseband or as apart of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, the instruction execution system, apparatus or element. The program codes contained on the computer readable medium may be transmitted with any suitable medium including, but not limited to, wireless, wired, optical cable, RF medium, or any suitable combination of the above.

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the function involved. It should also be noted that each block in the block diagrams and/or flowcharts as well as a combination of blocks may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor. For example, the processor may be described as: a processor comprising an analyzing unit, a determining unit, an acquiring unit and a feeding-back unit. The names of these units do not in some cases constitute a limitation to such units themselves. For example, the analyzing unit may also be described as "a unit for determining whether to enable a scenario mode based on received voice information."

In another aspect, the present disclosure further provides a computer readable medium. The computer readable medium may be the computer readable medium included in the electronic device described in the above embodiments, or a stand-alone computer readable medium not assembled into the electronic device. The computer readable medium stores one or more programs. The one or more programs, when executed by the electronic device, cause the electronic device to: determine whether to enable a scenario mode based on received voice information; determine, in response to determining to enable the scenario mode, a target scenario according to an analysis result of the voice information; acquire resource information related to the target scenario; and feed the acquired resource information back to a user.

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A method for processing information, comprising:
receiving a piece of voice information from a user, the piece of voice information comprising a voice instruction;
determining, based on a current time and a current location of the user when the piece of voice information is received from the user, whether to enable a scenario mode on a user terminal;
in response to determining to enable the scenario mode on the user terminal, determining a target scenario based on an analysis result of the piece of voice information;
acquiring a plurality kinds of resource information from various applications installed on the user terminal, the acquired plurality kinds of resource information including resource information targeted by the voice instruction acquired from a first application installed on the user terminal and resource information related to the determined target scenario acquired from a second application installed on the user terminal; and
feeding back the acquired plurality kinds of resource information to the user by displaying the acquired plurality kinds of resource information in at least two display boxes, for responding to the voice instruction in the piece of voice information.

2. The method according to claim 1, wherein the target scenario is used to represent a current scenario of the user, and the target scenario includes at least one of: a time scenario, a location scenario or a weather scenario.

3. The method according to claim 1, wherein the feeding back the acquired plurality kinds of resource information to a user includes:
generating voice feedback information based on the acquired resource information, and broadcasting the voice feedback information.

4. The method according to claim 1, wherein the feeding back the acquired plurality kinds of resource information to a user includes:
generating a page image based on the acquired plurality kinds of resource information, and presenting the page image, wherein the page image includes a first display region, and the at least two display boxes for displaying information are formed in the first display region.

5. The method according to claim 4, wherein the generating a page image according to the acquired plurality kinds of resource information includes:
extracting key information based on the acquired plurality kinds of resource information, and acquiring a background image; and
using the key information of the plurality kinds of resource information and the background image as display information of the plurality kinds of resource information, and displaying respectively display information of different resource information in the at least two display boxes.

6. The method according to claim 5, further comprising:
presenting in full-screen, in response to detecting a selection operation on the at least two display boxes by the user, detailed content of resource information corresponding to a display box selected by the user, wherein an approach of the selection operation includes at least one of: a voice operation, a touch operation or a key-pressing operation.

7. The method according to claim 5, wherein the page image further includes a second display region, and the method further comprises:
in response to detecting the selection operation on the at least two display boxes by the user, enlarging and displaying display information in the display box selected by the user in the second display region, or enlarging and displaying detailed content of resource information corresponding to a display box selected by the user in the second display region; and
in response to detecting the selection operation on the selected display box by the user again or detecting a holding time length of the current selection operation reaching a preset time length, displaying in full-screen the detailed content of the resource information corresponding to the selected display box.

8. The method according to claim 5, wherein the feeding back the acquired resource information to a user includes:
sorting the acquired plurality kinds of resource information, and feeding back the sorted plurality kinds of resource information to the user.

9. The method according to claim 1, wherein the determining whether to enable a scenario mode based on received piece of voice information includes:
determining whether the piece of voice information includes preset information in a preset data set; and
determining to enable the scenario mode in response to determining that the piece of voice information includes the preset information in the preset data set, wherein preset data in the preset data set includes the preset information and a preset scenario corresponding to the preset information; and wherein the determining a target scenario based on an analysis result of the piece of voice information includes:

finding, in the preset data set, a preset scenario corresponding to preset information included in the piece of voice information, to be used as the target scenario.

10. The method according to claim 9, wherein the preset data in the preset data set further includes an application identifier corresponding to the preset scenario; and the acquiring a plurality kinds of resource information related to the target scenario includes:

finding, in the preset data set, an application identifier corresponding to the target scenario, to be used as a target application identifier; and acquiring resource information of an application indicated by the target application identifier.

11. The method according to claim 1, wherein the feeding back the plurality kinds of acquired resource information to a user includes:

sorting the acquired resource information, and feeding back the sorted resource information to the user.

12. The method according to claim 11, further comprising:

performing a statistical analysis on interaction behaviors of the user, adjusting the plurality kinds of resource information related to the target scenario and/or adjusting the sorting of the plurality kinds of resource information based on the statistical analysis result.

13. The method according to claim 1, wherein the determining a target scenario based on an analysis result of the piece of voice information comprises:

determining the target scenario based on types of voiceprints included in the piece of voice information.

14. An electronic device, comprising:
one or more processors;
a receiving device, configured to receive piece of voice information;
a playing device, configured to play audio information;
a display screen, configured to present image information; and
a storage device, configured to store one or more programs,
wherein the one or more programs, when executed by the one or more processors, cause the one or more processors to implement the method according to claim 1.

15. An apparatus for processing information, comprising:
at least one processor; and
a memory storing instructions, the instructions when executed by the at least one processor, cause the at least one processor to perform operations, the operations comprising:
receiving a piece of voice information from a user, the piece of voice information comprising a voice instruction;
determining, based on a current time and a current location of the user when the piece of voice information is received from the user, whether to enable a scenario mode on a user terminal;
determining, in response to determining to enable the scenario mode on the user terminal, a target scenario according to an analysis result of the piece of voice information;
acquiring a plurality kinds of resource information from various applications installed on the user terminal, the acquired plurality kinds of resource information including resource information targeted by the voice instruction acquired from a first application installed on the user terminal and resource information related to the determined target scenario acquired from a second application installed on the user terminal; and feeding back the acquired plurality kinds of resource information to the user by displaying the acquired plurality kinds of resource information in at least two display boxes, for responding to the voice instruction in the piece of voice information.

16. The apparatus according to claim 15, wherein the feeding back the acquired plurality kinds of resource information to a user includes:

generating voice feedback information based on the acquired resource information, and broadcasting the voice feedback information.

17. The apparatus according to claim 15, wherein the feeding back the acquired plurality kinds of resource information to a user includes:

generating a page image based on the acquired plurality kinds of resource information, and presenting the page image, wherein the page image includes a first display region, and the at least two display boxes for displaying information are formed in the first display region.

18. The apparatus according to 17, wherein the generating a page image according to the acquired plurality kinds of resource information includes:

extracting key information based on the acquired plurality kinds of resource information, and acquiring a background image; and using the key information of the plurality kinds of resource information and the background image as display information of the plurality kinds of resource information, and displaying respectively display information of different resource information in the at least two display boxes.

19. The apparatus according to claim 18, wherein the operations further comprise:

presenting in full-screen, in response to detecting a selection operation on the at least two display boxes by the user, detailed content of resource information corresponding to a display box selected by the user, wherein an approach of the selection operation includes at least one of: a voice operation, a touch operation or a key-pressing operation.

20. A non-transitory computer readable medium, storing a computer program, wherein the computer program, when executed by a processor, cause the processor to perform operations, the operations comprising:

receiving a piece of voice information from a user, the piece of voice information comprising a voice instruction;

determining, based on a current time and a current location of the user when the piece of voice information is received from the user, whether to enable a scenario mode on a user terminal;

in response to determining to enable the scenario mode on the user terminal, determining a target scenario based on an analysis result of the piece of voice information;

acquiring a plurality kinds of resource information from various applications installed on the user terminal, the acquired plurality kinds of resource information including resource information targeted by the voice instruction acquired from a first application installed on the user terminal and resource information related to the determined target scenario acquired from a second application installed on the user terminal; and feeding back the acquired plurality kinds of resource information to the user by displaying the acquired plurality kinds of resource information in at least two display boxes, for responding to the voice instruction in the piece of voice information.

\* \* \* \* \*

UNITED STATES PATENT AND TRADEMARK OFFICE
CERTIFICATE OF CORRECTION

PATENT NO. : 11,474,779 B2
APPLICATION NO. : 16/508960
DATED : October 18, 2022
INVENTOR(S) : Xiangtao Jiang et al.

It is certified that error appears in the above-identified patent and that said Letters Patent is hereby corrected as shown below:

On the Title Page

Item (73), Lines 1-2, under Assignee, delete "Baidu Online Network Technology (Beijing) Co., Ltd., Beijing (CN)" and insert --Baidu Online Network Technology (Beijing) Co., Ltd., Beijing (CN); Shanghai Xiaodu Technology Co., Ltd.--.

Signed and Sealed this
Twenty-third Day of May, 2023

Katherine Kelly Vidal
*Director of the United States Patent and Trademark Office*